(12) United States Patent
Uemura et al.

(10) Patent No.: US 7,865,195 B2
(45) Date of Patent: Jan. 4, 2011

(54) MOBILE COMMUNICATION TERMINAL AND POSITION MONITORING METHOD

(75) Inventors: Masaru Uemura, Higashimurayama (JP); Takashi Iida, Nerima-Ku (JP); Shinji Ueno, Ichikawa (JP); Hidenori Sakaniwa, Kawasaki (JP); Shigeyuki Sudo, Yokohama (JP); Norikazau Takahashi, Fujisawa (JP); Yoshiaki Umehara, Hitachioota (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1324 days.

(21) Appl. No.: 11/359,243

(22) Filed: Feb. 22, 2006

(65) Prior Publication Data

US 2006/0205445 A1   Sep. 14, 2006

(30) Foreign Application Priority Data

Mar. 2, 2005   (JP)   ............................. 2005-057828

(51) Int. Cl.
  *H04W 24/00*   (2009.01)
(52) U.S. Cl. .................. 455/456.6; 455/456.1; 455/436
(58) Field of Classification Search .............. 455/456.6, 455/456.1, 436
  See application file for complete search history.

(56) References Cited

U.S. PATENT DOCUMENTS

| | | | |
|---|---|---|---|
| 7,149,201 B2* | 12/2006 | Hunzinger | 370/335 |
| 2004/0187039 A1* | 9/2004 | Yang | 713/300 |
| 2004/0224659 A1* | 11/2004 | Cheng | 455/404.1 |
| 2005/0215230 A1* | 9/2005 | Cheng | 455/404.2 |
| 2005/0255894 A1* | 11/2005 | Heller | 455/572 |
| 2006/0141960 A1* | 6/2006 | Fernandez et al. | 455/127.1 |

FOREIGN PATENT DOCUMENTS

| | | |
|---|---|---|
| JP | 8-327718 | 12/1996 |
| JP | 2001-338356 | 12/2001 |
| JP | 2002-209248 | 7/2002 |
| JP | 2002-335566 | 11/2002 |
| JP | 2003-18635 | 1/2003 |

(Continued)

OTHER PUBLICATIONS

Office Action dated Mar. 20, 2007 issued for the corresponding Korean Application No. 10-2006-0019251.

(Continued)

*Primary Examiner*—Patrick N Edouard
*Assistant Examiner*—Chuck Huynh
(74) *Attorney, Agent, or Firm*—Cohen Pontani Lieberman & Pavane LLP

(57) ABSTRACT

Location positioning setting information is read from a setting storage section when the user depressed a power key. The location positioning setting information comprises setting information, such as the maximum duration time of the location positioning operation and the operation timing when a power-off event has been generated. A control section turns off the power of a display section, a speaker, a microphone, etc., excluding a communication function for transmitting location positioning and positioning results. In this state, a location positioning section acquires the positional information of the mobile communication terminal. Then, a wireless communication section transmits the location positioning information of the positioned mobile communication terminal to a predetermined monitoring server which manages the positional information of the mobile communication terminal.

12 Claims, 7 Drawing Sheets

FOREIGN PATENT DOCUMENTS

| | | |
|---|---|---|
| JP | 2003-101640 | 4/2003 |
| JP | 2003-218767 | 7/2003 |
| JP | 2004-7194 | 1/2004 |
| JP | 2004-007194 | 1/2004 |
| JP | 2004-180218 | 6/2004 |

OTHER PUBLICATIONS

Office Action (with English translation) dated Mar. 21, 2008 issued for the counterpart Chinese Patent Application No. 2006100594575 (pp. 16).

* cited by examiner

| MAXIMUM POSITIONING DURATION TIME Tmax | LOCATION POSITIONING TRANSMISSION TIMING T1 |
|---|---|
| 1 HOUR | — |

| MAXIMUM POSITIONING DURATION TIME Tmax | LOCATION POSITIONING TRANSMISSION TIMING T1 |
|---|---|
| 10 MINUTES | SLOTTED MODE ONCE EVERY 5 TIMES |

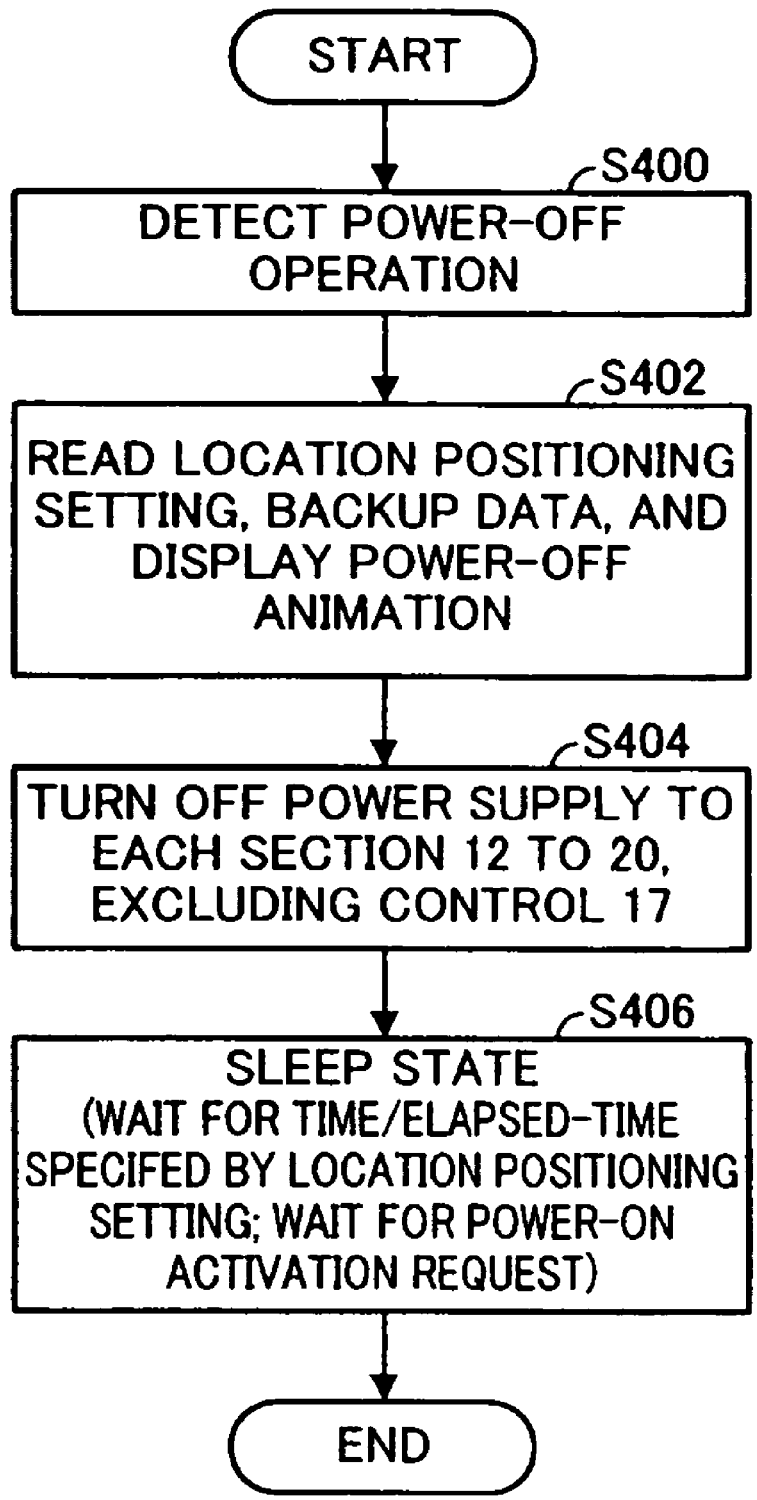

MOBILE COMMUNICATION TERMINAL AND POSITION MONITORING METHOD

CROSS-REFERENCE TO RELATED APPLICATION

This application is based upon and claims the benefit of priority from the prior Japanese Patent Application No. 2005-057828, filed Mar. 2, 2005, the entire contents of which is incorporated herein by reference.

BACKGROUND OF THE INVENTION

1. Field of the Invention

The present invention relates to a mobile communication terminal and a position monitoring method.

2. Description of the Related Art

The mobile phone has a feature enabling a positional search of the mobile terminal by a separate terminal in order to ensure the safety of the mobile phone owner or to verify the location of the mobile terminal. For example, there is a system wherein the location of a sub terminal can be verified by the main terminal by the terminal transmitting positional information to a monitoring center in response to a command from the monitoring center or transmitting positional information every predetermined time (for example, refer to Japanese Patent Laid-Open Publication No. 2003-18635)

Furthermore, with the mobile terminal equipped with the above-mentioned feature, a method can be considered wherein the current location can be transmitted to a monitoring center unit when the mobile terminal owner wishes to notify his location at a time of an emergency even when the power switch is turned off or if an emergency button is manipulated (for example, Japan Patent Laid-Open Publication No. 2002-209248)

In order to continue the foregoing positional search for an extended period of time, reduction of power consumption of the terminal is vital.

However, the technology described in Japanese Patent Laid-Open Publication No. 2003-18635 above is a proposal regarding the transmission timing of positional information and there is no mention of a positional search mode for further reducing power consumption.

Also, the technology described in Japan Patent Laid-Open Publication No. 2002-209248 above is a proposal for forcibly continuing positional search after the power has been turned off, and in this case, there is no mention of a positional search mode for further reducing power consumption in comparison to operation when the power is on. In particular, there is no proposal which takes into consideration reduction of power consumption under the assumption of a mode primarily using positional search when the positional search feature is provided with a mobile phone as an additional feature.

SUMMARY OF THE INVENTION

In light of the foregoing issues, an object of the present invention is to provide a mobile communication terminal and a position monitoring method, wherein the mobile communication terminal to which a positional search function has been added can perform positional search operations for an extended period of time by making the mobile communication terminal low-powered, and in addition, user-friendliness can be enhanced.

In order to achieve the foregoing object, the present invention is a mobile communication terminal for performing voice communication and data communication, comprising a display means for displaying an operation state, a manipulation means for receiving input from the user and which has a power key for operating power-off, a communication means for performing voice communication and data communication, a positional information acquisition means for acquiring positional information indicating current location, a power control means for turning off power supply to at least the display means and the manipulation means when a power-off operation is performed by the power key of the manipulation means, and a control means for transmitting positional information acquired by the positional information acquisition means to another terminal or a monitoring unit via a network by the communication means after power supply is turned off by the power control means.

In order to achieve the foregoing object, the present invention is a mobile communication terminal for performing voice communication and data communication, comprising a display means for displaying an operation state, a manipulation means for receiving input from the user and which has a power key for operating power-off, a communication means for performing voice communication and data communication, a positional information acquisition means for acquiring positional information indicating current location, a power control means for turning off power supply to at least the display means and the manipulation means when a power-off operation is performed by the power key of the manipulation means, and a control means for activating the communication means at a predetermined timing during a predetermined duration time after power supply has been turned off by said power control means, acquiring positional information from the positional information acquisition means when a location positioning request message is received from the other terminal or the monitoring unit during the predetermined duration time, and transmitting the acquired positional information to another terminal or a monitoring unit via a network by the communication means.

In order to achieve the foregoing object, the present invention is a position monitoring method of a mobile communication terminal for performing voice communication and data communication, comprising the steps of, acquiring positional information indicating current location when a power-off operation is performed, turning off power supply to at least the display means for displaying the operation state and the manipulation means for receiving input from a user including operating power-off after positional information indicating the current location is acquired, and transmitting acquired positional information to another terminal or a monitoring unit via a network after the power supply has been turned off.

In order to achieve the foregoing object, the present invention is a position monitoring method of a mobile communication terminal for performing voice communication and data communication, comprising the steps of, turning off power supply to at least the display means for displaying the operation state and the manipulation means for receiving input from a user including operating power-off is turned off when a power-off operation is performed, monitoring whether a location positioning request message has been received or not from said other terminal or said monitor during a predetermined duration time at a predetermined timing within the predetermined duration time after the power supply has been turned off, acquiring the positional information indicating the current position when the location positioning request message is received, and transmitting the acquired positional information to another terminal or a monitoring unit via a network by the communication means.

The above and further objects and novel features of the present invention will more fully appear from the following

BRIEF DESCRIPTION OF THE DRAWINGS

FIG. 9 is a flowchart for explaining the power-off sequence according to the second embodiment.

DETAILED DESCRIPTION OF THE PREFERRED EMBODIMENTS

Hereinafter, the preferred embodiments of the present invention will be described in detail with reference to the drawings.

A. First Embodiment

A-1 Configuration of the First Embodiment

Figure 1:
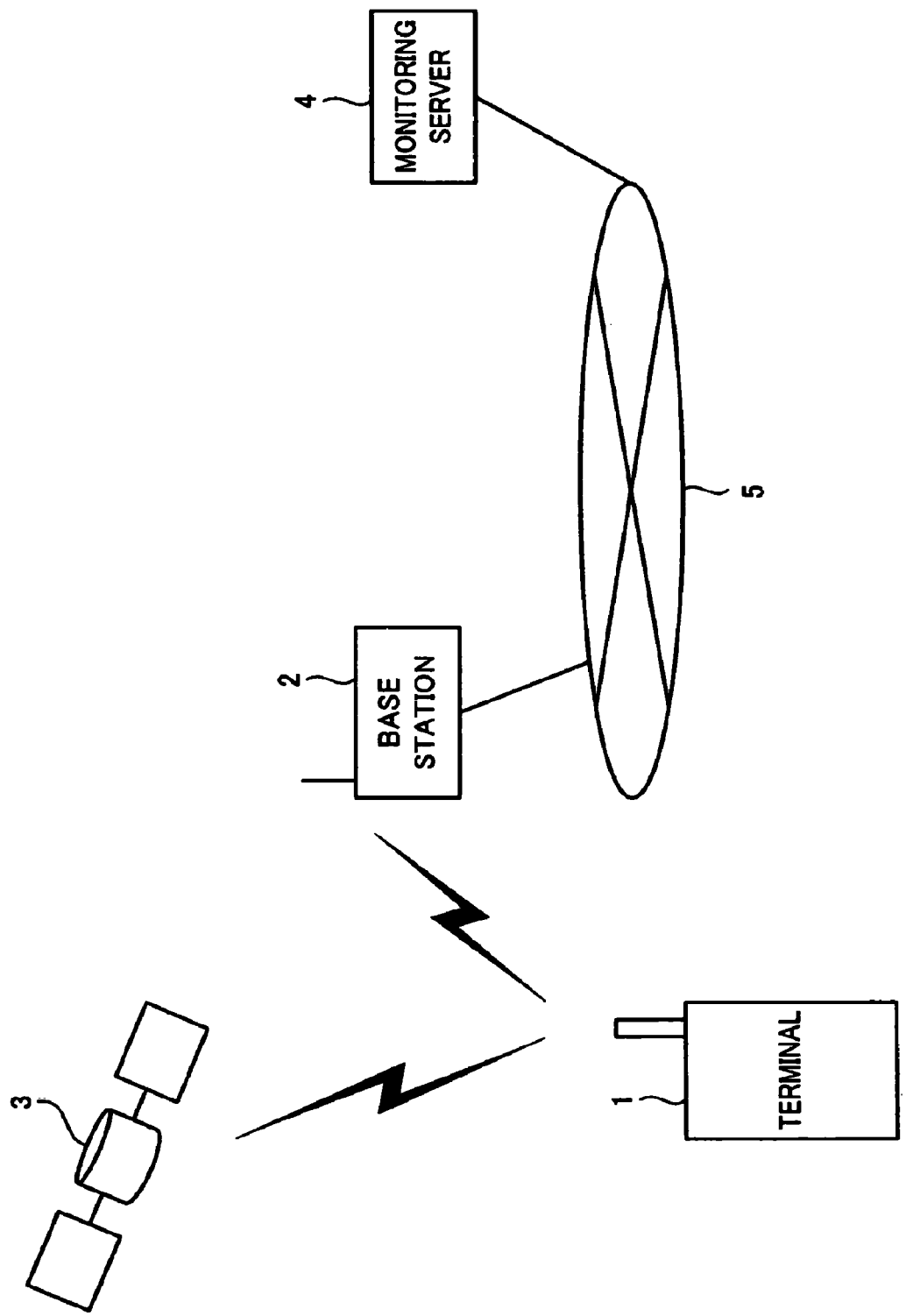
FIG. 1 is a block diagram showing a configuration of the overall system according to the first embodiment of the present invention.

FIG. 1 is a block diagram showing a configuration of the overall system according to the first embodiment of the present invention.

In this diagram, a mobile communication terminal 1 is the terminal to be the search object. A base station 2, which is the communication destination performing information communication with the mobile communication terminal 1, transmits a location determination request to the mobile communication terminal 1 and receives location positioning information from the mobile communication terminal 1. Global Positioning System (GPS) satellite 3, of which there is plurality of, is a satellite for transmitting GPS signals. The mobile communication terminal 1 receives a GPS signal from the GPS satellites 3 and acquires positional information. With regard to positional information, error information of the GPS signals from the GPS satellites 3, positional information from the base station 2 and the like can be received and highly accurate positional information can be derived from this information.

A monitoring server 4, which performs monitoring and search of the search object, receives a request from a contracted user or a request from a crisis-response organization or the police during an emergency and issues a location positioning request to search for a particular terminal. In addition, the monitoring server 4, which is connected to a communication network 5 such as the internet, a public switched telephone network (PSTN), a dedicated network, etc., receives a location positioning request from the contracted user, transmits the location positioning request to a particular terminal (in this case, the mobile communication terminal 1) via the base station 2, receives a location positioning result from the mobile communication terminal 1 via the base station 2, and manages the positional information of the mobile communication terminal 1.

Figure 2:
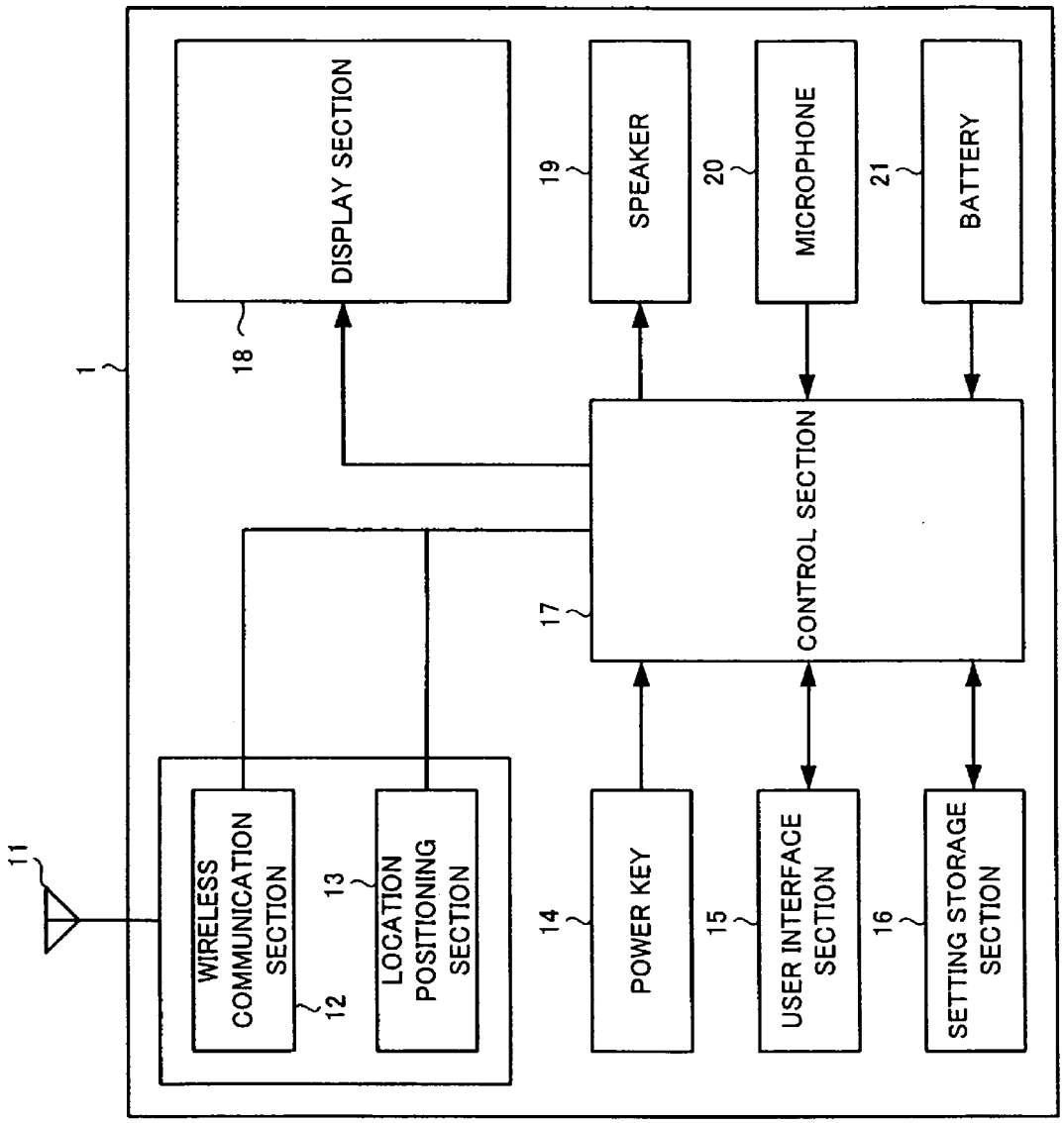
FIG. 2 is a block diagram showing a configuration of a mobile communication terminal according to the first embodiment.

Next, FIG. 2 is a block diagram showing a configuration of the mobile communication terminal according to the first embodiment.

In this diagram, the mobile communication terminal 1 comprises an antenna 11, a wireless communication section 12, a location positioning section 13, a power key 14, a user interface section 15, a setting storage section 16, a control section 17, a display section 18, a speaker 19, a microphone 20, and a battery 21.

The antenna 11 transmits and receives various data. The wireless communication section 12 controls the transmission and reception of information to and from a communication destination via the antenna 11. The location positioning section 13 positions the current location of the mobile communication terminal 1 using GPS and the like. The power key 14 is a power switch enabling the operation of the power-on and -off function of the mobile communication terminal 1 which activates a location positioning sequence of the present invention when depressed (described hereafter).

The user interface section 15 receives input from the user. The setting storage section 16 stores the location positioning setting information used in a location positioning implementation program. The control section 17 controls each section to execute the location positioning sequence of the present invention. The display section 18 comprises a LCD or the like and displays text and images to the user. The speaker 19 outputs voice to the user and the microphone 20 picks up voice from the user. The battery 21 supplies power to each section. Power is not supplied to the display section 18, the speaker 19, and the microphone 20 when the power is off, excluding the communication function.

A-2 Operations of the First Embodiment

Figure 3:
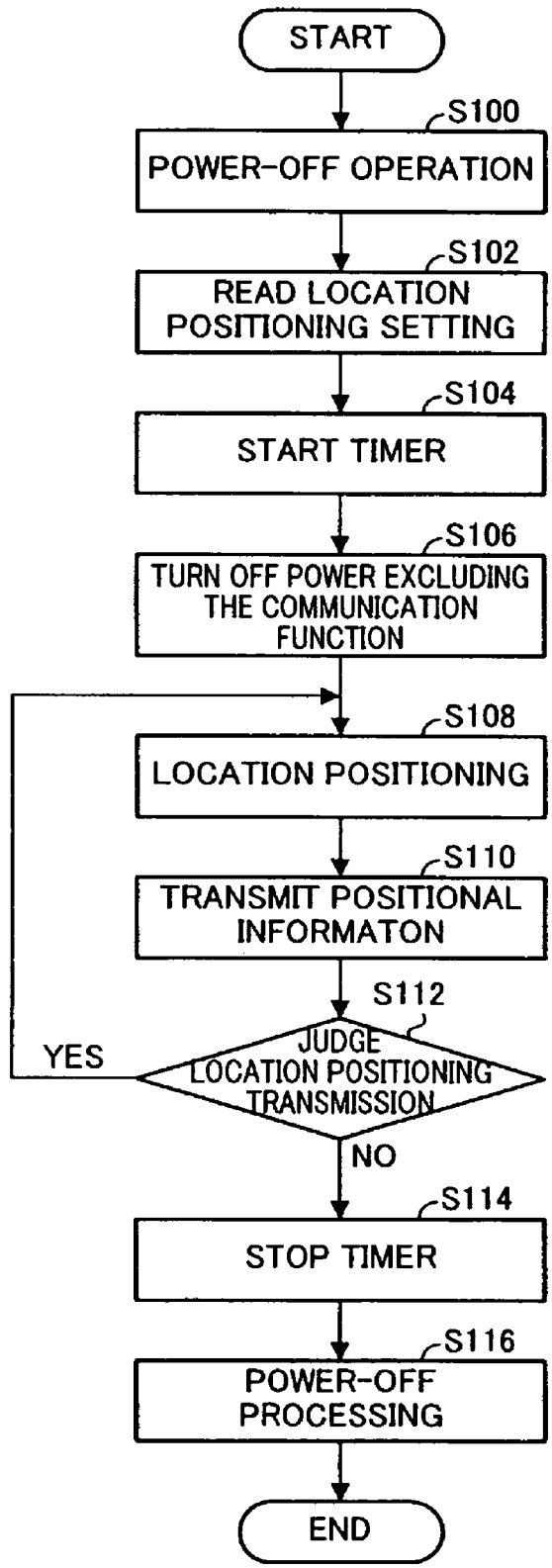
FIG. 3 is a flowchart for explaining a location positioning operation sequence during a power-off operation in the first embodiment.

Next, the operations of the foregoing first embodiment are described. Here, FIG. 3 is a flowchart for explaining a location positioning operation sequence during a power-off operation in the first embodiment. This location positioning operation sequence operates when a low-power operation mode centered on positional search is set.

When the user depresses the power key 14 via the user interface (Step S100), location positioning setting information is read with this event as a trigger (Step S102). Although the details of the location positioning setting information will be explained hereafter, this information specifies the location positioning implementation method of the mobile communication terminal 1 and comprises setting information, such as the maximum duration time, timing, etc., of the location positioning implementation when a power-off event is generated. Then, timer count commences (Step S104). This timer is used to perform operation according to the location positioning setting information read in Step S102 and monitors the maximum duration time and operation timing of the location positioning operation.

Next, power to the display section 18, the speaker 19, the microphone 20, etc., excluding the communication function for transmitting location positioning and positioning results, is turned off (Step S106). Since power to the display section 18, the speaker 19, and the microphone 20 is cut off, it appears to the user that the power of the mobile communication terminal 1 has been turned off. In this way, an effect can be obtained, wherein power consumption during this sequence operation can be minimized by turning off power, excluding that of the location positioning and the communication function.

In this state, a GPS positioning application, for example, is booted and positional information of the mobile communication terminal 1 is acquired from the location positioning section 13 (Step S108). Then, the location positioning information of the positioned mobile communication terminal 1 is transmitted by the wireless communication section 22 to a predetermined monitoring server 4 which manages the positional information of the mobile communication terminal 1 (Step S110). Thus, the positional information of the location wherein the user depressed the power key 14 and the power was turned off can be notified to the monitoring server 4. The monitoring server 4 receives the location positioning information from the mobile communication terminal 1 and manages the location of the mobile communication terminal 1. When necessary, the monitoring server 4 can issue a location positioning request to the mobile communication terminal 1, and the mobile communication terminal 1 which has received the location positioning request can transmit the positional information to the monitoring server 4.

Subsequently, whether positional information has been transmitted correctly is determined according to whether or not a location positioning request had been received and to the read location positioning setting information (Step S112). The details of this judgment processing are explained hereafter with reference to FIG. 4. When determined in the abovementioned judgment that the location positioning will be implemented, the process returns to Step S108 and the transmission of location positioning and positional information is repeated. On the other hand, if determined in the abovementioned judgment that the positional information has been transmitted correctly, the timer is stopped (Step S114) and the power of the communication function is turned off (Step S116).

Figures 4, 5A, 5B:
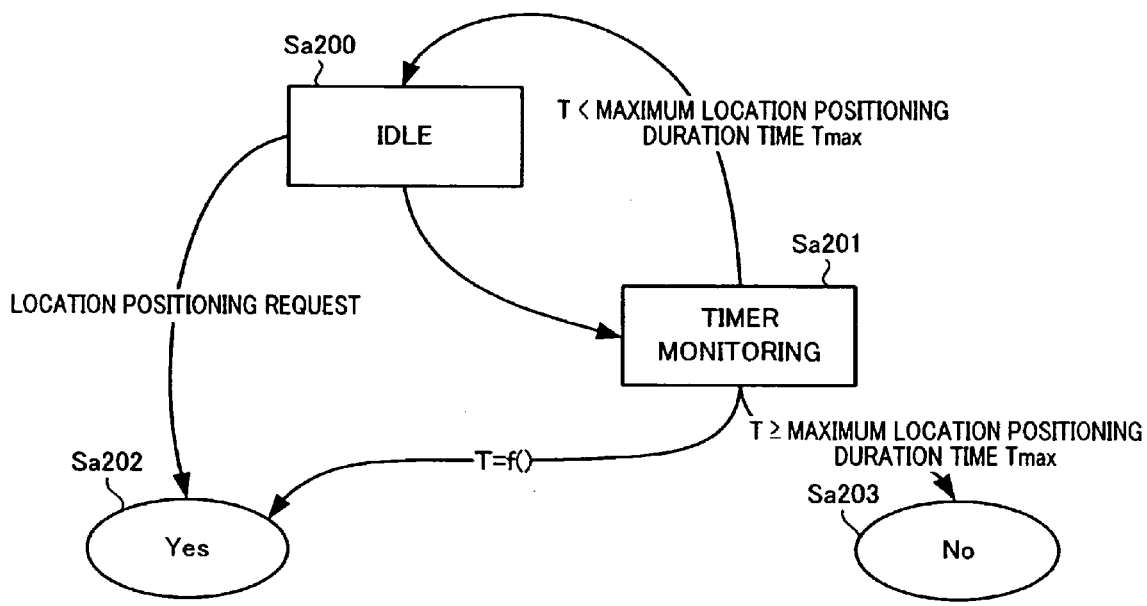
FIG. 4 is a conceptual diagram for explaining a state transition in a location positioning transmission judgment processing according to the first embodiment.
FIG. 5A and FIG. 5B are conceptual diagrams showing an example of location positioning setting information according to the first embodiment.

Next, FIG. 4 is a conceptual diagram for explaining a state transition in a location positioning transmission judgment processing according to the first embodiment. First, the mobile communication terminal 1 is in an idle state Sa200. The idle state refers to a state wherein communication with a communication destination via a base station can be started immediately, a state wherein a location positioning request from a communication destination can be received, or a state wherein location positioning information can be transmitted. In this idle state Sa200, whether the judgment result of the foregoing Step S112 is a YES or a NO is determined by the generated event.

In the idle state Sa200, the timer which has started counting in the foregoing Step S104 (elapsed time T) is monitored (Sa201). If the elapsed time T is less than the maximum location positioning duration time Tmax of the location positioning setting information read in the foregoing Step S102, the idle state Sa200 is maintained. On the other hand, if the elapsed time T is more than the maximum location positioning duration time Tmax of the location positioning setting information in the timer monitoring state Sa201, the continuation of the idle state Sa200 is halted and enters a state Sa203 wherein the judgment result of Step S112 is NO. In addition, if a location positioning request is received from the communication destination in the idle state Sa200, a state Sa202 wherein the judgment result in Step S112 is YES is entered.

In this manner, location positioning requests can be received from the communication destination, the positional information of the mobile communication can be transmitted until the maximum location positioning duration time Tmax is reached, and the monitoring server 4 can verify the location of the mobile communication terminal 1.

During the present sequence operation, since the display section 18, the speaker 19, the microphone 20 and the like of the mobile communication terminal 1 is already turned off and the user already acknowledges that the mobile communication terminal 1 is in a power-off state in Step S106, incoming and outgoing operations of voice, data, and messaging services other than location positioning request messages are preferably disabled.

Messaging services are services for activating and operating an application when a certain message is received from a communication destination. As a method for disabling the incoming and outgoing transmission of voice, data, and messaging services, operations related to incoming and outgoing voice and data and messaging services are ignored and notifications indicating the rejection of the messages are transmitted to the communication destination during the power-off sequence operation in FIG. 3. In other words, with regards to incoming and outgoing processing and message reception, the activation of respective applications is prevented and only the necessary positional search function is enabled. The ignoring of operations related to incoming calls means to continue a reception processing as if an alert with information message has not been detected without transmitting a response even if a message regarding the incoming call had been received and detected.

Furthermore, when a voice communication, e-mail communication, etc. arrives, the response message of the arrival (voice communication, e-mail communication, etc.) indicates a function which performs an operation of sounding a ring tone or ring melody, vibrating, displaying an icon or character notifying the user of a voice communication and/or e-mail communication arrival, etc. and notifies the user of an arrival (voice communication, e-mail communication, etc.).

In the first embodiment, although an application necessary for positioning is activated and a positioning processing is executed only when a location positioning request message is received, interface functions, such as the display section 18 and the speaker 19 for notifying the user of the implementation of positioning, remains turned off even at this time and power conservation effects are further enhanced.

Furthermore, in the idle state Sa200, a slotted mode for receiving a notification message for positional search from a communication destination at every prescribed time is executed in order to reduce power consumption. Slotted mode does not turn on the reception function consecutively and continuously, but rather enables the reception function only when required, in synchronization with a transmission slot timing from a base station assigned to the mobile communication terminal 1 (for example, base station 2). At this time, a hand-off operation for switching the base station and sector on standby and a location registration operation for when the location registration zone for calling has been moved are preferably continued.

Hand-off operation refers to switching communication to an adjacent base station when stronger electric waves can be received from the adjacent base station than that from the base station currently in communication. Through this, the mobile communication terminal 1 can move between base stations while continuing communication. The hand-off operation is further executed between sectors which are disposed within the base station and are divided according to the directional characteristics of the electric waves. In addition, registered zones of a fairly wide-ranged unit, covered by a plurality of base stations, are managed within the communication system. The communication system enables incoming transmission in a moving environment by registering a zone wherein the mobile communication terminal is located by a location registration message transmitted from the mobile communication terminal 1 and executing a call from the base stations within this zone.

Therefore, if the mobile communication terminal 1 moves by crossing this registered zone, a situation requiring a new location registration may transpire. Normally, in accompaniment to the hand-off processing above, the necessity of location registration is determined by the mobile communication terminal 1 by system parameters identifying the zone receiving notification from a base station.

In the location registration processing, power consumption is significant because transmission from the mobile communication terminal 1 is required. Therefore, in the idle state Sa200, a setting for executing a location registration to further ensure message transmission and a setting for omitting the location registration accompanying transmission while continuing hand-off operation to continue reception in order to further enhance power conservation effects can be considered.

In addition, when the foregoing location positioning setting information comprises information related to the maximum location positioning duration time Tmax and the location positioning transmission timing, the process can change to the state Sa202 wherein the judgment result in Step S112 becomes YES if the elapsed time T by the timer matches the value of function f(T) indicating the location position transmission timing (T=f(T)) in the timer monitoring state Sa201. For example, when changing to a YES state Sa202 at time interval T1 in slotted mode executed in the idle state Sa200, a judgment program for changing to the YES state Sa202 when the elapsed time T becomes an integral multiple of the time interval T1 can be applied.

In addition, the use of key manipulation from the user interface section 15 for judgment can be considered in f(T). In this case, if a particular key set by the user (not shown) is manipulated in the idle state Sa200, this can be used for location positioning operations and to transmit emergency signals.

If there is no information related to location positioning transmission timing in the above-mentioned location positioning setting information, an operation in accordance to the location positioning request from the communication source is performed during the maximum location positioning duration time Tmax.

Next, FIG. 5 is a conceptual diagram showing an example of location positioning setting information according to the first embodiment. In the location positioning setting information, the maximum positioning duration time Tmax indicating the duration of time the location positioning is continued in the present sequence, the location positioning transmission timing T1, and the like can be specified. The maximum positioning duration time Tmax is the maximum time of the timer started in the above-mentioned Step S104 and specifies the amount of time an idle state Sa200 can be continued and response to a location positioning request can be made after a power-off operation. By setting a maximum time, the location positioning sequence can be operated for only the specified amount of time.

The location positioning transmission timing T1 specifies the time interval of the location positioning implementation timing when executing a terminal-led location positioning while less than the maximum positioning duration time Tmax. For example, a location positioning is executed when the timer which has started counting matches the integral multiple of the time interval specified by the location position transmission timing.

However, if a terminal-led location positioning operation and a location positioning request from the communication destination are generated simultaneously, the location positioning operation is preferably given priority. This is because it can be considered that a message other than the location positioning request from the communication destination may be embedded and a flexible response can be made in an emergency by enabling priority operation. When a terminal-led location positioning is not implemented, the location positioning transmission timing does not have to be set.

In FIG. 5A, it is shown that a location positioning request from the communication destination is received up to a maximum of one hour after the power-off operation of the mobile communication terminal 1. In FIG. 5B, it is shown that the location positioning request is received for ten minutes after the power-off operation of the mobile communication terminal 1, and furthermore the location positioning is performed every five times the slotted mode is executed.

Although the location positioning setting information is stored in the setting storage section 16 in FIG. 1 and is read in the foregoing Step S104, location positioning setting can also be comprised in the location positioning request message from the communication destination. In this case, operation is performed according to the maximum positioning duration time Tmax and the location positioning transmission timing T1 comprised in the location positioning request message specified by the communication destination. For example, when the maximum positioning duration time Tmax is set to infinite, the location positioning information transmission according to the present sequence is implemented and the monitoring server 4 can monitor the location of the mobile communication terminal 1 until the power of the mobile communication terminal 1 runs out. In this case, the location positioning setting information received from the communication destination is preferably prioritized over the read location positioning setting information. In this way, a location positioning method suited for the request from the location registration requester becomes possible.

Figure 6A:
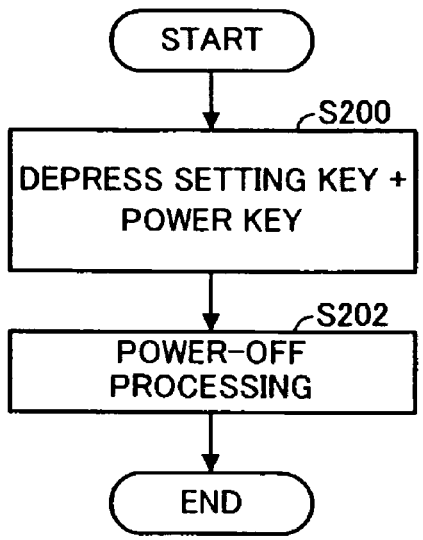
FIG. 6A and FIG. 6B are flow charts for explaining a power-off sequence according to the first embodiment.
Figure 6B:
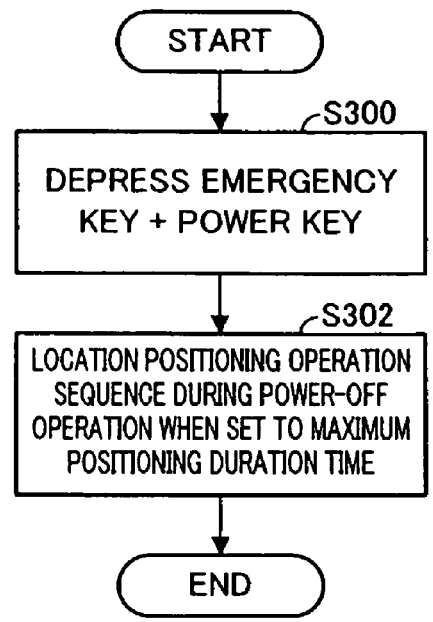
Figure 7:
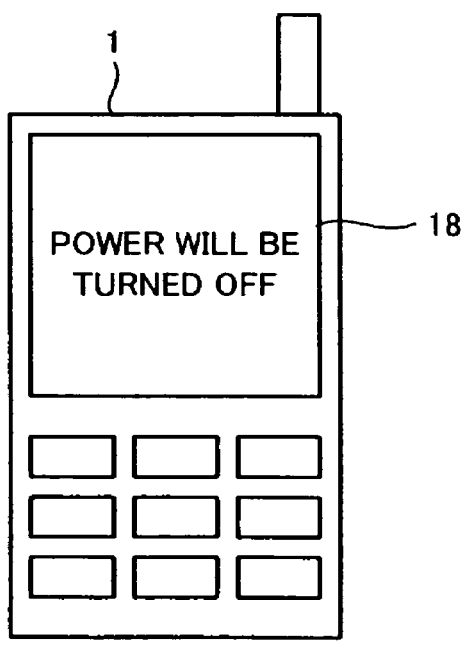
FIG. 7 is a pattern diagram showing an example of a notification by a display section when the power supply to the communication function and the display function of the mobile communication terminal 1 has been terminated.

Next, FIG. 6A and FIG. 6B are flowcharts explaining a power-off sequence according to the first embodiment. As shown in FIG. 6A, when a setting set by the user (not shown) and the power key 14 are depressed simultaneously (Step S200) when the power of the mobile communication terminal 1 is turned on, a power-off processing is executed and the power supply to the communication function and the display function of the mobile communication terminal 1 is terminated (S202). This operation also terminates the power supply to the communication function for location positioning when the user wishes to reduce battery consumption in a positional search-based mode as well.

In summary, the setting key is the setup itself for canceling the power saving mode of the present invention. In addition, it is a password which individual users set up. The setting key can be set in advance or set by the user. When set by the user, a third party can be prevented from turning off the power of the location positioning function and the communication function as long as the setting key is unknown.

Furthermore, setting a plurality of setting keys and preparing an emergency setting key (not shown) in addition to the setting key (not shown) for turning off power supply to the communication function and the display function can be considered. When the setting key and the power key 14 are depressed simultaneously, the operation shown in FIG. 6A is executed. On the other hand, when the emergency setting key (not shown) and the power key 14 are depressed simultaneously (Step S300) in an emergency as shown in FIG. 6B, the positional information of the mobile communication terminal 1 is managed by the monitoring server 4 and the location positioning operation sequence during a power-off operation when the maximum positioning duration time Tmax is set to infinite is performed (Step S302). In other words, in this case, the maximum positioning duration time Tmax becomes infinite and a mode enabling positional search until the battery of the mobile communication terminal 1 runs out is entered regardless of the location positioning setting and a more positional search-based operation can be executed.

As described above, when terminating power supply to the communication function and the display function of the mobile communication terminal 1 by depressing the setting key or the emergency setting key (both not shown) and the power key 14 simultaneously, the display section 18 of the mobile communication terminal 1 displays that the power will be turned off. Thus, the user can be notified that the power to the mobile communication terminal 1 comprising the positional search function has been cut and user-friendliness can be enhanced.

While the first embodiment described above is an example describing the present invention, it is our intention that the scope of the invention be not limited only to this embodiment. This invention may be embodied in several forms without departing from the spirit of the essential characteristics thereof. For example, the notification destination of the positional information and the transmitting source of the location positioning request message can be another opposing mobile communication terminal, via a network rather than the monitoring server 4.

B. Second Embodiment

Figure 8:
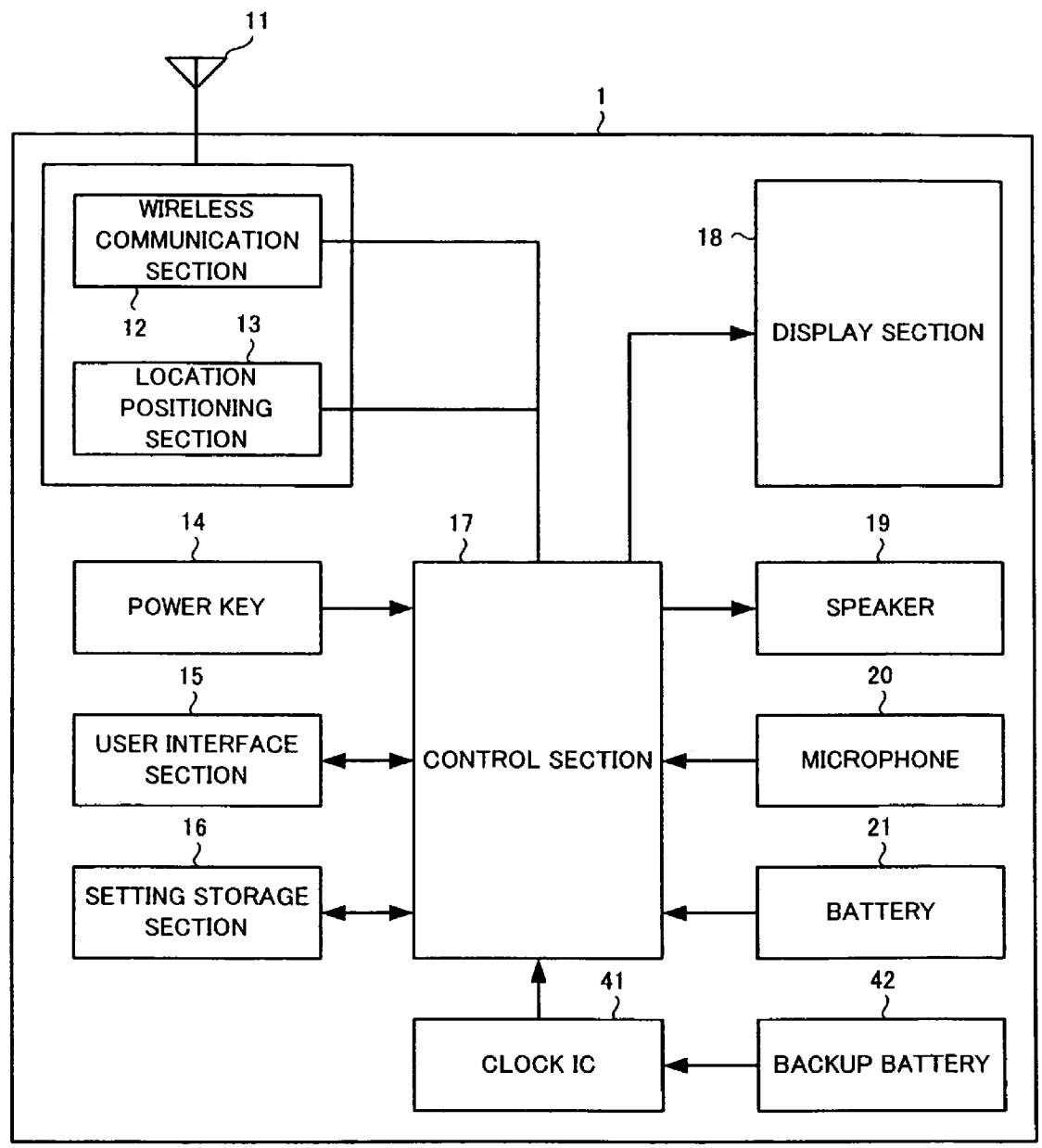
FIG. 8 is a block diagram showing a configuration of the mobile communication terminal according to a second embodiment of the present invention.

Next, a second embodiment of the present embodiment is described. FIG. 8 is a block diagram showing a configuration of the mobile communication terminal according to the second embodiment. In the explanation of FIG. 8, sections corresponding to those in FIG. 2 are given the same reference numbers and the explanations thereof are omitted.

In FIG. 8, a clock IC 41, which is connected to the control section, comprises a calendar function and is driven by a back-up battery 42.

Next, the operations of the second embodiment are described. Here, FIG. 9 is a flowchart explaining a power-off sequence in the second embodiment. When a power-off operation by the power key 14 is detected (Step S400), a power-off animation is displayed in the display section 18, and additionally, a power-off processing comprising a processing for reading location positioning setting information from the setting storage section 16 and a data backup processing is executed (Step S402). Next, power supply to each of the sections from the wireless communication section 12 to the microphone 20, excluding the control section 17, is turned off (Step S404).

The location positioning setting information here comprises at least specification of time or amount of time. The pattern thereof can be either that indicating a certain time period of a day or that indicating a predetermined passage of time from the time at which the power-off operation was executed. After the power supply to each section excluding the control section 17 has been turned off, the control section 17 enters a sleep state which waits for a power-on activation request or waits for a time or a passage of time specified by the location positioning setting information (Step S406).

In the sleep state, the specified time can be detected by periodically reading the time data of the clock IC 41 or the clock IC 41 can be set such that an interrupt is generated when a specified time is reached. In addition, the power-on activation request is generated by a power-on circuit, not shown, and the power supply necessary for the resetting of the control section 17 is also started and maintained by this same circuit. The control section 17 is reset by an activation request when the power is on and cancels operations according to the location positioning setting information.

Next, the operations based on the location positioning setting information in the sleep state are described. The control section 17 turns on the power of the wireless communication section 1 and the location positioning section 13 and controls the operations thereof, during the duration time managed by the timer processing after a predetermined elapsed time or a set time period, based on time data notified by the calendar function of the clock IC 41.

When a location positioning request is received in this idle state, the location positioning application is booted, a positioning processing executed automatically, and positional information is transmitted to the request destination. At this time, unlike during a normal power-on, neither display nor notification by audio of the state of the mobile communication terminal 1 including positional state is performed. Therefore, power supply to the display section 18 and the speaker 19 is not performed.

In the second embodiment, responses related to the hand-off and location registration processing and responses related to incoming messages excluding location positioning requests in a state awaiting a location positioning request message can be the same as those in the idle state Sa200 in the first embodiment described above. The accuracy of an incoming transmission and power-conservation effects in this idle state Sa200 are almost the same as that in the first embodiment. Although there is an increase due to the clock IC 41, this is a general-purpose IC and is expected to be several μA.

According to the second embodiment above, when the power is turned off, the mobile communication terminal 1 performs a reception operation of location positioning requests under temporal conditions set by the location positioning setting information stored in the setting storage section 16 in advance and enters the foregoing sleep state during times other than the specified time. Thus, a low-power, positioning-based operation mode can be actualized.

While the present invention has been described with reference to the preferred embodiments, it is intended that the invention be not limited by any of the details of the description therein but includes all the embodiments which fall within the scope of the appended claims.

What is claimed is:

1. A mobile communication terminal for performing voice communication and data communication, comprising:
a display means for displaying an operation state;
a manipulation means for receiving input from the user and which has a power key for operating power-off;
a communication means for performing voice communication and data communication;
a positional information acquisition means for acquiring positional information indicating current location;
a power control means for turning off power supplied to at least the display means and the manipulation means when a power-off operation is performed by the power key of the manipulation means;
a control means for transmitting positional information acquired by the positional information acquisition means to another terminal or a monitoring unit via a network by the communication means after the supplied power has been turned off by the power control means; and
a storage means for storing location positioning duration time information prescribing an amount of time the positional information is acquired and location positioning timing information prescribing the timing for acquiring the positional information;
wherein said control means (i) activates said communication means, enters an idle state at a predetermined timing interval during a predetermined duration of time, and reads the location positioning duration time information and the location positioning timing information from the storage means after the supplied power has been turned off by said power control means, (ii) performs the positional information acquisition from said positional information acquisition means when a location positioning request message is received from said other terminal or said monitoring unit during the timing indicated by the location positioning timing information until a location positioning time duration indicated by the location positioning duration time information is reached, and (iii) transmits the acquired positional information to the other terminal or the monitoring unit via the network by said communication means; and
wherein said power control means turns off the power supplied to the communication means after lapse of the predetermined duration of time.

2. The mobile communication terminal according to claim 1, wherein said control means executes a slotted mode in an idle state, the location positioning request message being received until said predetermined duration of time is reached, and wherein transmission of an acknowledge message is not performed when an incoming voice message is received during the slotted mode.

3. The mobile communication terminal according to claim 1, wherein said control means executes a slotted mode in an idle state, the location positioning request message being received until said predetermined duration of time is reached, continues a hand-off operation for changing a standby destination in the slotted mode, and omits a location registration operation when the location registration operation is requested in accompaniment with movement of a registered zone.

4. The mobile communication terminal according to claim 1, wherein:
said location positioning timing information comprises a time interval for implementing location positioning; and
said control means performs the positional information acquisition from said positional information acquisition means when the location positioning request message is received from said other terminal or said monitoring unit during the timing interval until said location positioning time duration is reached.

5. The mobile communication terminal according to claim 1, wherein:
said manipulation means comprises a setting key; and
said control means performs the positional information acquisition from said positional information acquisition means when the location positioning request message is received from said other terminal or said monitoring unit during the timing indicated by said location positioning duration timing information when the setting key is manipulated until said location positioning time duration indicated by the location positioning duration time information is reached, and transmits the acquired positional information to the other terminal or the monitoring unit via the network by said communication means.

6. The mobile communication terminal according to claim 1, wherein said control means acquires the positional information by said positional information acquisition means by assigning priority to the location positioning duration time information comprised in the location positioning request message when the location positioning duration time information is comprised in the location positioning request message from said other terminal or said monitoring unit and transmits the acquired positional information to the other terminal or the monitoring unit via the network by said communication means.

7. The mobile communication terminal according to claim 1, wherein:
said manipulation means comprises a setting key; and
said power control means turns off the power supplied to at least said positional information acquisition means, said communication means, and said display means when the setting key and said power key are manipulated simultaneously.

8. The mobile communication terminal according to claim 1, wherein:
said manipulation means comprises an emergency key;
said power control means turns off the power supplied to at least said positional information acquisition means, said communication means, and said display means when the emergency key and said power key are manipulated simultaneously; and
said control means activates said communication means at a predetermined timing during the predetermined duration of time after the power supplied has been turned off by said power control means, acquires positional information from said positional information acquisition means when the location positioning request message is received from said other terminal or said monitoring unit during the predetermined duration of time, and transmits the acquired positional information to the other terminal or the monitoring unit via the network by said communication means.

9. The mobile communication terminal according to claim 8, wherein said display means displays that power will be cut off before the supplied power is turned off by said power control means.

10. The mobile communication terminal according to claim 1, wherein said control means controls execution of a slotted mode in an idle state, the location positioning request message being received from said other terminal or said monitoring unit until said predetermined duration of time is reached, and continues a hand-off operation for changing a standby destination in the slotted mode and a location registration operation when the location registration operation is requested in accompaniment with movement of a registered zone.

11. The mobile communication terminal according to claim 1, wherein said control means executes a slotted mode in an idle state, the location positioning request message being received from said other terminal or said monitoring unit until said predetermined duration of time is reached, continues a hand-off operation for changing a standby destination in the slotted mode, and omits a location registration operation when the location registration operation is requested in accompaniment with movement of a registered zone.

12. A position monitoring method of a mobile communication terminal for performing voice communication and data communication, wherein the mobile communication terminal comprises a display means for displaying an operational state, a manipulation means for receiving input from a user including a power off operation, a communication means for performing at least one of voice communication and data communication, and a storage means for storing location positioning duration time information prescribing an amount of time that positional information is acquired and location positioning timing information prescribing timing for acquiring the positional information, the method comprising the steps of:

turning off power supplied to at least the display means when a power-off operation is performed;

activating the communication means and entering an idle state at a predetermined timing interval during a predetermined duration of time;

reading the location positioning duration time information and the location positioning timing information from the storage means;

monitoring whether a location positioning request message has been received from another terminal or monitoring unit during the predetermined duration of time at the predetermined timing interval after the power supply has been turned off;

acquiring the positional information indicating a current position when the location positioning request message is received during the timing indicated by the location positioning timing information until a location positioning timing indicated by the location positioning duration time information is reached;

transmitting the acquired positional information to the other terminal or the monitoring unit via the network by the communication means; and turning off the power supplied to the communication means after lapse of the predetermined duration of time.

* * * * *